United States Patent [19]

Hayakawa et al.

[11] Patent Number: 4,751,929
[45] Date of Patent: Jun. 21, 1988

[54] ULTRASONIC BLOODSTREAM DIAGNOSTIC APPARATUS WITH DUAL DISPLAYS OF VELOCITY PROFILES AND AVERAGE FLOW VELOCITY

[75] Inventors: Yoshihiro Hayakawa, Sagamihara; Yasuhiro Nakamura, Tokyo; Masami Kawabuchi, Yokohama, all of Japan

[73] Assignee: Matsushita Electric Industrial Co., Ltd., Japan

[21] Appl. No.: 823,094

[22] Filed: Jan. 21, 1986

[30] Foreign Application Priority Data

Jan. 23, 1985 [JP] Japan ................................ 60-10056

[51] Int. Cl.$^4$ ....................... G06F 11/00; G06F 15/42
[52] U.S. Cl. ................................ 128/663; 73/861.25; 364/416; 364/726
[58] Field of Search ................ 364/200 MS File, 715, 364/416, 726; 128/660-663; 73/861.25, 861.06; 340/347 DD

[56] References Cited

U.S. PATENT DOCUMENTS

| | | | |
|---|---|---|---|
| 4,265,126 | 5/1981 | Papadofrangakis | 128/663 |
| 4,305,063 | 12/1981 | Hanson | 340/347 DD |
| 4,432,031 | 2/1984 | Premerlani | 361/97 |
| 4,583,553 | 4/1986 | Shah et al. | 128/708 |

Primary Examiner—Maryann Lastova
Attorney, Agent, or Firm—Lowe, Price, LeBlanc, Becker & Shur

[57] ABSTRACT

A ultrasonic bloodstream diagnostic apparatus wherein the frequencies of Doppler shift ultrasound information are analyzed by a frequency analyzer to derive a power spectrum represented by N-bit data. The N-bit data comprises (K+M+L) bits, where K represents the number of binary 0's in the highest order bit positions and varies in the range between zero and N−M, M represents a fixed number of significant bits immediately following the binary 0's and L represents the number of insignificant bits in the lowest order bit positions immediately following the M significant bits, where K+L equals N−M. A data compression technique is employed to conver the N-bit data to (m+l)-bit data by a data conversion circuit, with the m bits respectively identical to the M bits and l bits being a binary representation of the number of the L bits. A microprocessor derives a signal representing the average frequency of the power spectrum from the (m+l)-bit output data signal. The (m+l)-bit output data signal is converted by a conversion memory to a form suitable for display by an algorithm which reconverts it to N-bits and logarithmically compresses the latter.

5 Claims, 2 Drawing Sheets

FIG.2a
$\begin{cases} \text{INPUT} & 0\ 0\ 0\ 0\ 0\ 0\ 1\ 1\ 1\ 1\ 1 \\ \text{OUTPUT} & \underbrace{1\ 1\ 1\ 1\ 1}_{\text{MANTISSA}}\ \underbrace{0\ 0\ 0}_{\text{INDEX}} \end{cases}$ FIG.2b
$\begin{cases} \text{INPUT} & 0\ 0\ 0\ 1\ 1\ 1\ 0\ 0\ 0\ 0\ 0 \\ \text{OUTPUT} & \underbrace{1\ 1\ 1\ 0\ 0}_{\text{MANTISSA}}\ \underbrace{1\ 0\ 0}_{\text{INDEX}} \end{cases}$ FIG.2c
$\begin{cases} \text{INPUT} & 1\ 1\ 1\ 1\ 1\ 1\ 1\ 1\ 1\ 1\ 1 \\ \text{OUTPUT} & \underbrace{1\ 1\ 1\ 1\ 1}_{\text{MANTISSA}}\ \underbrace{1\ 1\ 1}_{\text{INDEX}} \end{cases}$ FIG.2d
$\begin{cases} \text{INPUT} & 1\ 1\ 1\ 1\ 0\ 0\ 0\ 0\ 0\ 0\ 0 \\ \text{OUTPUT} & \underbrace{1\ 1\ 1\ 1\ 1}_{\text{MANTISSA}}\ \underbrace{1\ 1\ 1}_{\text{INDEX}} \end{cases}$

ULTRASONIC BLOODSTREAM DIAGNOSTIC APPARATUS WITH DUAL DISPLAYS OF VELOCITY PROFILES AND AVERAGE FLOW VELOCITY

BACKGROUND OF THE INVENTION

The present invention relates to an ultrasonic bloodstream diagnostic apparatus for providing a display of velocity profiles as a function of time, and more particularly to a circuit for providing a simultaneous display of velocity profiles and a display of an average blood flow velocity with greater accuracy than is currently available.

Ultrasonic Doppler shift imaging techniques have found extensive use in medical applications where it is desired to obtain a bloodstream spectrum in a B-scan mode on a real-time basis. To provide dual displays of velocity profiles and average flow velocity, ultrasonic diagnostic apparatus comprises a quadrature phase detector which detects phase quadrature Doppler shifted signals. These signals are digitized and fed to a digital frequency analyzer to obtain real and imaginary components of frequency spectrum. To determine the direction of blood flow the frequency spectrum data are passed through a squaring circuit and a summing amplifier to obtain power spectrum data. The power spectrum data are then fed to a logarithmic processor to reduce the number of data bits representing the power spectrum so it conforms with the B-scan monitor dynamic range with due regard to the size and cost of a scan converter and a digital-to-analog converter which processes the power spectrum data into a form suitable for display. Recently developed techniques employ microprocessors for computing the power spectrum average frequency from the compressed power spectrum data and for displaying a bloodstream average flow velocity simultaneously with velocity profiles. However, the logarithmic compression of data bits results in an average frequency value which is inaccurate due to the nonlinearity of the logarithm.

SUMMARY OF THE INVENTION

Accordingly, it is an object of the present invention to provide accurate measurements of average flow velocity for an ultrasonic bloodstream with a diagnostic apparatus capable of simultaneous display of velocity profiles and average flow velocity.

The present invention provides a circuit for processing ultrasonic data representing Doppler frequency shifts responsive to bloodstream flow velocities. The processing circuit comprises a frequency analyzer for analyzing the frequencies of the received information and power spectrum deriving means for deriving from the analyzer output an N-bit digital signal representing the power spectrum of the Doppler frequency shifts. The N-bit data comprises (K+M+L) bits, where K represents the number of binary 0's which may be present in the higher bit positions and varies in the range between zero and N−M, M represents a predetermined fixed number of significant bits immediately following the most significant bit binary 0's and L represents the number of least significant bits present in the lower bit positions immediately following the M significant bits, K+L being equal to N−M. Data compression means converts the N-bit digital signal to a (m+l)-bit output signal, the m bits being respectively identical to the M bits of the N-bit data and the l bits being a binary representation of the number of the L bits. Averaging means is provided for deriving a signal representing the average frequency of the power spectrum from the (m+l)-bit output signal. Data conversion means derives a replica of the N-bit data from the (m+l)-bit output signal.

BRIEF DESCRIPTION OF THE DRAWINGS

The present invention will be described in further detail with reference to the accompanying drawings, in which:

FIGS. 2a to 2d are illustrations of data bits involved in data compression by the data compression memory of FIG. 1.

DETAILED DESCRIPTION

Figure 1:
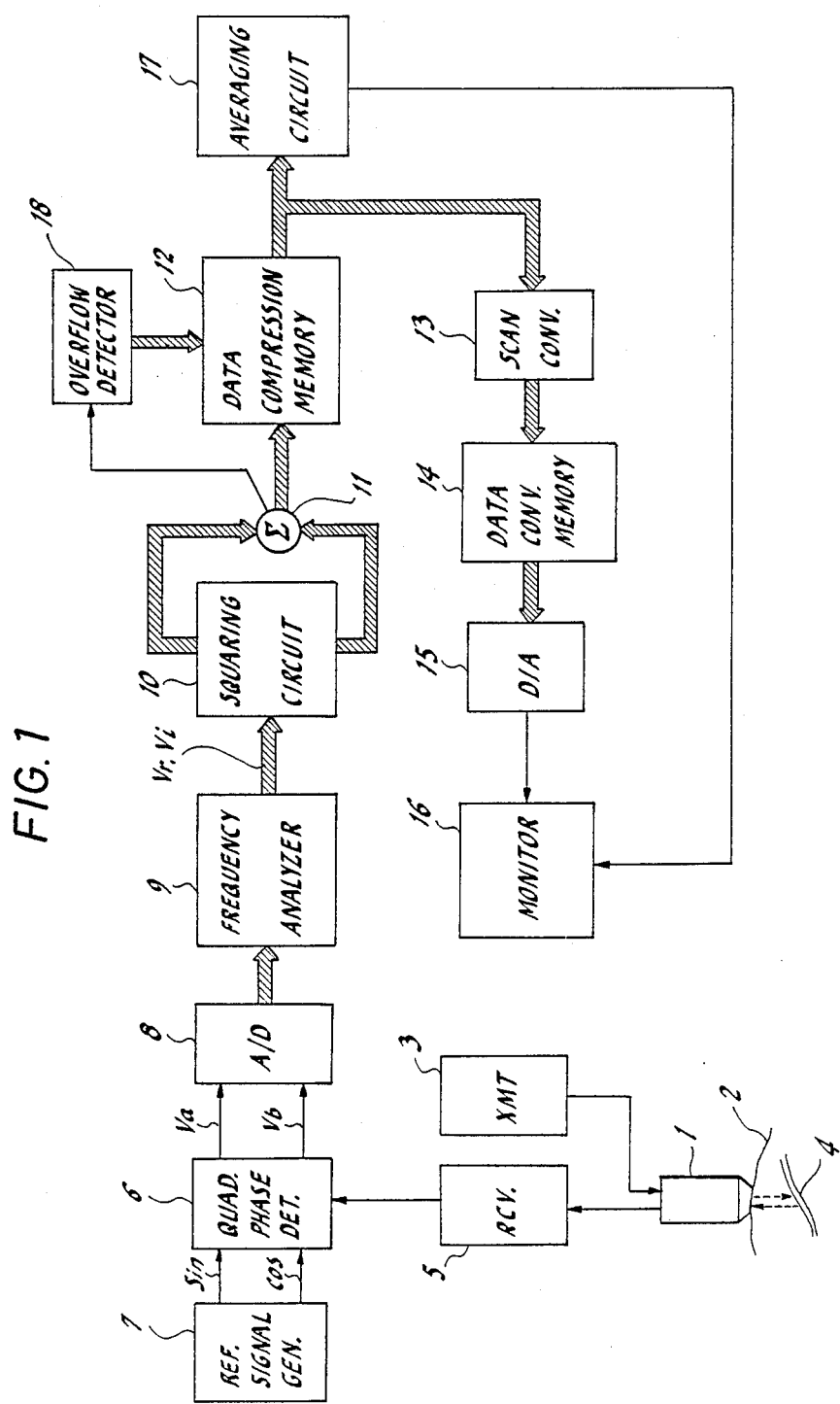
FIG. 1 is a block diagram of an ultrasonic imaging apparatus according to a preferred embodiment of the present invention.

Referring now to FIG. 1, there is shown an ultrasonic bloodstream diagnostic apparatus according to the present invention wherein an ultrasonic probe 1 is in contact with the body of a patient 2. Probe 1 is excited by a transmit circuit 3 either in a continuous or pulsed mode to emit acoustic energy into a vessel 4 of the patient body to be examined. Acoustic energy reflected from the vessel carries Doppler shift information representing the flow rate of the bloodstream. The reflected energy is detected by the same acoustic probe 1 which transduces it to a signal that is coupled to a quadrature phase detector 6 after amplification by a receive circuit 5. A reference signal generator 7 supplies reference phase quadrature signals to phase detector 6 to generate output signals Va and Vb representing the Doppler frequency shifts. Doppler shift signals Va and Vb are supplied to an analog-to-digital converter 8, which samples and quantizes each input signal into a 10-bit digital signal representing the blood flow rate with a resolution of $2^{10}$. The quantized signals are interleaved with each other to produce a multiplexed signal which is applied to a frequency analyzer 9, analyzes the multiplexer signal at prescribed frequency points of the spectrum, typically 128 points, using fast Fourier transformation technique, to detect the frequency spectrum of the Doppler shift. This frequency analysis is accomplished for a period of up to several tens of milliseconds to provide a real-time display of the spectrum. The results of the frequency analysis are represented by a 16-bit digital signal Vr indicating the real part of the spectrum data and a 16-bit digital signal Vi indicating the imaginary part.

The output signals Vr and Vi of frequency analyzer 9 are multiplexed at the input of a squaring circuit 10 where each component is squared and demultiplexed from the other component. The square values of the real and imaginary components Vr and Vi are each represented by 16-bit data which are summed in an adder 11. As is known in the art, the sum of the squared real and imaginary parts indicates the blood flow direction; hence, the output of adder 11 represents the flow direction of blood in vessel 4.

Since the output of adder 11 is a 16-bit data signal, as obtained by the squaring circuit 10, it is necessary to reduce the number of bits to be processed by later stages, a result achieved by removing insignificant bits and compressing the remaining bits at the output of adder 11 into a series of significant bits. This is accomplished by a data compression circuit 12. In a preferred embodiment, data compression circuit 12 comprises a read-only memory, typically having a capacity of 32 kilobits. The two highest order bits and two lowest order bits of the 16-bit output of adder 11 are eliminated and the intermediate 12 bits are applied as address data to memory 12. The two lowest order bits represent quantum noise. Let N represent the total number of bits contained in the output of adder 11. The N-bit output data can be considered as comprising (K+M+L) bits, where K represents the number of binary 0's present in the highest order bit positions and varies in the range between zero and N−M, M represents a fixed number of significant bits following the highest order binary 0's, L represents the number of bits in the lowest order bit positions following the M significant bits, and K+L equals N−M. In a typical example, with M being equal to 5, the value of K varies in a range between zero and 7 and the total of the K and L values equals 7.

Data compression memory 12 stores a plurality of 8-bit output data words, with each data word comprising a first block of 5 bits respectively identical to the M significant bits of the N-bit input data and a second block of 3 bits which are binary representation of the number of the L bits of the N-bit data. Each data word is stored in a memory location addressable as a function of the N-bit input data. If, e.g., the N-bit input data is a series of "000000011111" as shown in FIG. 2a, the K-value is 7, the M significant bits are "11111" and the L-value is zero. Therefore, the data stored in the location addressable as a function of the input data "000000011111" comprises a first block of "11111" and a second block of "000." If the input data is represented as the binary sequence "000111000000" shown in FIG. 2b, the K-value is 3, the M significant bits are "11100" and the L-value is 4, representing the fact that there are four lowest order binary bit positions after the M bits. Therefore the data word stored in the corresponding address location comprises a first block "11100" identical to the M significant bits and a second block "100" representing the L-value. If the input data comprises all binary 1's (FIG. 2c), the K-value is zero and the output data comprises a first block m="11111" identical to the binary 1's in the M highest bit positions and a second block l="111" representing the fact that there are seven binary bit positions after the M bits.

It will be seen therefore that an 8-bit output data word of the same value "11111111" will be generated for a set of 12-bit inputs ranging from "111110000000" to "111111111111" as shown in FIGS. 2c and 2d. This means that the seven lowest order bits have a maximum error of "1111111." However, this error accounts for only about 3 percent of possible input bit combinations which is negligible for practical purposes.

To compensate for errors which would be introduced by the elimination of the next-to-highest, i.e., 15-th, bit position of the adder output data, an overflow detector 18 is connected to the 15-th bit position of the output of adder 11 to detect the presence of a binary 1 in that bit position. In response to a binary 1 being in the 15-th bit position, detector 18 generates a 12-bit address which causes the data compression memory 12 to read out an 8-bit output data word having the maximum value of "11111111."

The output of data compression memory 12 is fed to an averaging circuit 17, or a microprocessor, which derives an average value of Doppler shift frequencies from the power spectrum and calculates the average flow velocity V according to the following equation:

$$\Delta f = 2 f_0 \cdot V \cos \theta / C$$

where, $\Delta f$ is the average frequency, $f_0$ is the frequency of the acoustic energy, C is the velocity of propagation of acoustic energy within tissues, and $\theta$ represents the angle between the direction of acoustic energy and the vector of bloodstream. The average flow velocity data are displayed on a video monitor 16. Since the propagation velocity C is known as approximately 1,540 meters per second, the average flow velocity V is readily obtained by the angle $\theta$.

The compressed data are also applied to a scan converter 13 where the scan format of the ultrasonic probe 1 is converted to the raster scan format of a video monitor 16. The compressed data are reconverted to the original 12-bit data and compressed to an 8-bit format according to a logarithmic function by a data conversion circuit 14; the 8-bit format at the output of circuit 14 is adapted to the dynamic range of a digital-to-analog converter 15. This is accomplished by a read-only memory which stores plural 8-bit data words. The stored 8-bit data words are derived from the reconversion of the 8-bit compressed data to the original 12-bit data and subsequent logarithmic conversion of the latter to an 8-bit format. The 8-bit data are stored in locations addressable as a function of the 8-bit compressed data words. Each 8-bit data word read out of the memory 14 is converted to an analog signal by D/A converter 15 and displayed in a raster scan format by the monitor 16 simultaneously with the average flow rate data supplied from the averaging circuit 17.

The foregoing description is only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A circuit for processing ultrasonic diagnostic information carrying Doppler frequency shifts which indicate the flow velocity of bloodstream, comprising:

a frequency analyzer for analyzing the frequencies of said diagnostic information;

power spectrum deriving means for deriving from the analyzed frequencies N-bit data representing the power spectrum of said Doppler frequency shifts, said N-bit data comprising (K+M+L) bits, where K represents the number of binary 0's present in the highest order bit position of the N-bit binary data, M represents a fixed number of significant bits immediately following said binary 0's in the K highest order bit positions, L represents the number of bits present in the L lowest bit positions of said N-bit data immediately following said M fixed number of significant bits, where K is in a range between zero and N−M, and K+L equals N−M;

data compression means for converting said N-bit data to (m+l)-bit output data, where the m bits are respectively identical to said M significant bits and the l bits are a binary representation of the number of said L bits, said data compression means including a first memory storing said (m+l)-bit output data in locations addressed in response to a function of said N-bit data, averaging means for deriving a signal representing the average frequency of said power spectrum from said (m+l)-bit output data; and data conversion means for converting said (m+l)-bit output data to a form suitable for display, said data conversion means including a secondary memory storing second output data representative of a nonlinear conversion of a replica of the N-bit data derived from said (m+l)-bit output data, the second data in said second memory being stored in locations addressed in response to a function of said (m+l)-bit output data.

2. A circuit as claimed in claim 1, wherein said power spectrum deriving means includes means for squaring the output of said frequency analyzer, the squared value of the analyzer output comprising said N-bit data plus an insignificant bit in a position higher than the N-bit data plus an insignificant bit in a position lower than the N-bit data, and further comprising compensation means for detecting a binary 1 in one of said higher positions for causing said data compression memory to generate said (m+l)-bit output data of maximum value to compensate for elimination of said insignificant bit of said higher bit position.

3. An ultrasonic bloodstream diagnostic apparatus comprising:

an ultrasonic probe for transmitting and receiving ultrasonic energy;

transmit/receive circuit means for causing said probe to transmit ultrasonic energy into a patient body and receive ultrasonic energy returning from tissues of said patient body;

quadrature phase detector means for deriving a pair of phase quadrature signals from said receiving ultrasonic energy;

analog-to-digital converter means for digitizing said phase quadrature signals;

a frequency analyzer for analyzing the frequencies of said digitized signals; squaring means for squaring each of said digitized signals;

adder means for summing the squared digitized signals together and generating an N-bit power spectrum data signal, said N-bit power spectrum data signal comprising (K+M+L) bits, where K represents the number of binary 0's present in the highest order bit positions of the N-bit data, M represents a fixed number of significant bits immediately following said binary 0's, and L represents the number of insignificant bits present in the lowest order bit positions of said N-bit data immediately following said significant bits, where K is in a range between zero and N−M, and L+L equals N−M;

data compression means for converting said N-bit data to (m+l)-bit output data, where the m bits are respectively identical to said M significant bits and the l bits are binary representation of the number of said L bits, said data compression means including a first memory storing said (m+l)-bit output data in locations addressed in response to a function of said N-bit data signal, averaging means for deriving a signal representing the average frequency of said power spectrum from said (m+l)-bit output data and deriving therefrom a signal representing the average speed of the patient's bloodstream;

data conversion means for converting the (m+l)-bit output data to a form suitable for display, said data conversion means including a second memory storing second output data representative of a nonlinear conversion of said replica of N-bit data derived from said (m+l)-bit data, the data in said second memory being stored in locations addressed as a function of said (m+l)-bit data, digital-to-analog converter means for converting the output of said data conversion means to an analog signal; and monitor means for providing a display of bloodstream velocity profiles in response to said analog signal and a display of an average bloodstream velocity in response to said average speed representative signal.

4. An ultrasonic bloodstream diagnostic apparatus as claimed in claim 3, wherein said frequency analyzer provides fast Fourier transformation on said digitized signals.

5. An ultrasonic bloodstream diagnostic apparatus as claimed in claim 3, wherein the output of said adder comprises said N-bit data plus an insignificant bit in a bit position higher than the N-bit data plus an insignificant bit in a bit position lower than the N-bit data, and further comprising compensation means for detecting a binary 1 in said higher position for causing said memory to generate an (m+l)-bit output data signal of maximum value to compensate for elimination of said insignificant bit of the higher bit position.

* * * * *